United States Patent
Demri et al.

(10) Patent No.: US 11,922,819 B2
(45) Date of Patent: Mar. 5, 2024

(54) SYSTEM AND METHOD FOR AUTONOMOUSLY LANDING A VERTICAL TAKE-OFF AND LANDING (VTOL) AIRCRAFT

(71) Applicants: Amnon Demri, Bat Shlomo (IL); Idan Shimon, Hod Hasharon (IL)

(72) Inventors: Amnon Demri, Bat Shlomo (IL); Idan Shimon, Hod Hasharon (IL)

(73) Assignee: WONDER ROBOTICS LTD, Hod Hasharon (IL)

( * ) Notice: Subject to any disclaimer, the term of this patent is extended or adjusted under 35 U.S.C. 154(b) by 42 days.

(21) Appl. No.: 16/853,984

(22) Filed: Apr. 21, 2020

(65) Prior Publication Data

US 2020/0334993 A1 Oct. 22, 2020

Related U.S. Application Data (60) Provisional application No. 62/836,739, filed on Apr. 22, 2019.

(51) Int. Cl.
*G08G 5/00* (2006.01)
*G05D 1/00* (2006.01)
(Continued)

(52) U.S. Cl.
CPC ......... *G08G 5/0039* (2013.01); *G05D 1/0094* (2013.01); *G05D 1/0676* (2013.01); *G08G 5/0069* (2013.01); *G08G 5/025* (2013.01)

(58) Field of Classification Search
CPC .... G08G 5/0039; G08G 5/0069; G08G 5/025; G08G 5/0091; G08G 5/045; G05D 1/0094; G05D 1/0676
See application file for complete search history.

(56) References Cited

U.S. PATENT DOCUMENTS 9,612,123 B1 * 4/2017 Levinson ............... B60Q 5/006
2016/0009410 A1   1/2016 Derenick et al.
(Continued)

FOREIGN PATENT DOCUMENTS

| CN | 106708066 | 5/2017 |
|---|---|---|
| KR | 101651600 | 8/2016 |
| WO | 2018110088 | 6/2018 |

OTHER PUBLICATIONS

Wang, Yang; Yang, Jun; Transmission Frequency Modulation Detection under Variable Sonar-Target Speed Conditions; 2013; mdpi.com, pp. 1 3550 (Year: 2013).*

(Continued)

*Primary Examiner* — Aniss Chad
*Assistant Examiner* — Chase L Cooley (57) ABSTRACT

A system for autonomously landing a Vertical Take-Off and Landing (VTOL) aircraft, comprising: a first sensor; a second sensor; and a processing resource configured to: (a) obtain, from the first sensor, first readings; (b) generate, at a first rate, based on at least part of the first readings, a 3D model of at least, part of a scene visible by the first sensor; (c) obtain, from the second sensor, a plurality of second readings, enabling identifying changes within the at least part of the scene; (d) analyze at least part of the second readings, at a second rate, to obtain changes information indicative of the changes; (e) identify, using the 3D model and the changes information, potential landing areas for the aircraft; (f) generate commands to maneuver the aircraft towards a selected landing area of the potential landing areas; and (g) repeat steps (a) to (f) until landing the aircraft.

16 Claims, 3 Drawing Sheets

(51) Int. Cl.
    *G05D 1/06*     (2006.01)
    *G08G 5/02*     (2006.01)

(56) References Cited

U.S. PATENT DOCUMENTS

| | | | |
|---|---|---|---|
| 2016/0114905 A1* | 4/2016 | Derenick | G08G 5/025 |
| | | | 701/16 |
| 2017/0102713 A1 | 4/2017 | Lim | |
| 2017/0212528 A1 | 7/2017 | Henderson | |
| 2019/0273909 A1* | 9/2019 | Ye | G06T 7/579 |

OTHER PUBLICATIONS

Rambus; Researchers Eye Optical Flow for Drone Navigation; Feb. 3, 2016; Rmabus; pp. 1 (Year: 2016).*

Desaraju, V.R., Michael, N., Humenberger, M., Brockers, R., Weiss, S. and Matthies, Vision-Based Landing Site Evaluation and Trajectory Generation Toward Rooftop Landing. In Robotics: Science and Systems. L.H., 2014.

* cited by examiner

SYSTEM AND METHOD FOR AUTONOMOUSLY LANDING A VERTICAL TAKE-OFF AND LANDING (VTOL) AIRCRAFT

TECHNICAL FIELD

The invention relates to a system and method for autonomously landing a vertical take-off and landing (VTOL) aircraft.

BACKGROUND

Existing solutions for autonomously landing a VTOL aircraft require marking landing areas, prior knowledge of the landing areas, or a human operator involved in the landing process. However, due to the expected increase in VTOL aircraft usage and the level of automation that will be required to support various applications (mostly in populated areas), safety requirements and regulation, there is a need for a solution that enables autonomous precision landing of a VTOL aircraft in an unknown, unmarked, or unattended landing area.

There is thus a need for a new system and method for autonomously landing a VTOL aircraft.

References considered to be relevant as background to the presently disclosed subject matter are listed below. Acknowledgement of the references herein is not to be inferred as meaning that these are in any way relevant to the patentability of the presently disclosed subject matter.

Korean Patent No. 101651600, published on Aug. 29, 2016, relates to a drone for unmanned flight with an automatic landing function by a stereo camera, in particular a three-dimensional topography of the landing zone by analyzing a stereo vision technique having automatic landing function by a stereo camera that can automatically down on the ground.

Desaraju et al, "Vision-Based Landing Site Evaluation and Trajectory Generation Toward Rooftop Landing, Robotics: Science and Systems 2014, describes an active perception strategy that enables micro air vehicles (MAVs) with limited onboard sensing and processing capabilities to concurrently assess feasible rooftop landing sites with a vision-based perception system while generating trajectories that balance continued landing site assessment and the requirement to provide visual monitoring of an interest point. The contributions of the work are twofold: (1) a perception system that employs a dense motion stereo approach that determines the 3D model of the captured scene without the need of geo-referenced images, scene geometry constraints, or external navigation aids; and (2) an online trajectory generation approach that balances the need to concurrently explore available rooftop vantages of an interest point while ensuring confidence in the landing site suitability by considering the impact of landing site uncertainty as assessed by the perception system. Simulation and experimental evaluation of the performance of the perception and trajectory generation methodologies are analyzed independently and jointly in order to establish the efficacy of the proposed approach.

U.S. Patent Application Publication No. 2016/0114905, published on Apr. 28, 2016, describes a method of probabilistic safe landing area determination for an aircraft includes receiving sensor data indicative of current conditions at potential landing areas for the aircraft. Feature extraction on the sensor data is performed. A processing subsystem of the aircraft updates a probabilistic safe landing area map based on comparing extracted features of the sensor data with a probabilistic safe landing area model. The probabilistic safe landing area model defines probabilities that terrain features are suitable for safe landing of the aircraft. A list of ranked landing areas is generated based on the probabilistic safe landing area map.

International Patent Application No. 2018/110088, published on Jun. 21, 2018, describes an unmanned aircraft that is able to properly make an emergency landing in case of an abnormality. The unmanned aircraft is configured as a multicopter which flies with the lift and thrust generated by the rotation of six rotors. Upon detecting an abnormality during flight, the unmanned aircraft identifies an emergency landing site, and controls a motor, which drives the rotors, to land in the identified emergency landing site. As a result, it is possible to make an autonomous emergency landing at a specific site in case of an abnormality.

GENERAL DESCRIPTION

In accordance with a first aspect of the presently disclosed subject matter, there is provided a system for autonomously landing a Vertical Take-Off and Landing (VTOL) aircraft, the system comprising: a first sensor; a second sensor; and a processing resource configured to perform the following during a landing process for landing the VTOL aircraft: (a) obtain, from the first sensor, first readings enabling generating a Three-Dimensional (3D) model of at least part of a scene visible by the first sensor; (b) generate, at a first rate, based on at least part of the first readings, the 3D model of the at least part of the scene; (c) obtain, from the second sensor, a plurality of second readings, enabling identifying changes within the at least part of the scene visible by the first sensor; (d) analyze at least part of the second readings, at a second rate, different than the first rate, to obtain changes information indicative of the changes within the at least part of the scene; (e) identify, using the 3D model and the changes information, potential landing areas for the VTOL aircraft, being landing areas on which the VTOL aircraft is capable of landing; (f) generate maneuvering commands configured to cause maneuvering and descending of the VTOL aircraft towards a selected landing area of the potential landing areas; and (g) repeat steps (a) to (f) until landing the VTOL aircraft.

In some cases, the scene is an unknown scene, and the processing resource does not have a prior 3D model of the scene.

In some cases, the second rate is higher than the first rate.

In some cases, the changes result from motion of one or more objects within the at least part of the scene.

In some cases, the changes information is obtained by analyzing groups of at least pairs of the second readings.

In some cases, the potential landing areas are not pre-marked.

In some cases, the potential landing areas are unattended.

In some cases, the aircraft is a drone.

In some cases, the second sensor is the first sensor, or a part thereof.

In some cases, at least one of the first sensor or the second sensor is one of the following: a Light Detection And Ranging (LIDAR), a radar, a structured light sensor, a Time Of Flight (TOF) sensor, a stereoscopic camera, a camera, a Doppler sensor, an ultrasonic sensor, or a video motion detection (VMD) sensor.

In some cases, the system further comprises: a third sensor capable of acquiring information enabling identification of obstacles between the VTOL aircraft and the selected landing area, wherein the processing resource is further configured to obtain at least one reading from the third sensor during the landing process, and wherein the maneuvering commands are generated so that the VTOL aircraft avoids existing obstacles, if any, on its path to the selected landing area.

In some cases, the third sensor is a Continuous Transmission Frequency Modulated (CTFM) ultrasonic sensor.

In some cases, upon the VTOL aircraft reaching a pre-determined height with respect to the selected landing area, the processing resource is configured to execute an optical flow algorithm based on readings acquired by at least one of the first sensor or the second sensor to obtain optical flow information and utilize the optical flow information to maneuver the VTOL aircraft until the landing of the VTOL aircraft.

In some cases, upon the VTOL aircraft reaching a pre-determined height with respect to the selected landing area, the processing resource is configured to execute an optical flow algorithm based on readings acquired by an optical flow sensor to obtain optical flow information and utilize the optical flow information to maneuver the VTOL aircraft, until the landing of the VTOL aircraft.

In some cases, the processing resource is configured to generate the 3D model when the VTOL aircraft is below a first pre-determined height of the VTOL aircraft with respect to a reference point, and to analyze the at least part of the second readings when the VTOL aircraft is below a second pre-determined height of the VTOL aircraft with respect to the reference point, wherein the second pre-determined height is different than the first pre-determined height.

In some cases, the processing resource is further configured to obtain wind information, and the identify is based also on the wind information.

In some cases, the processing resource is further configured to obtain wind information, and the maneuvering commands configured to cause maneuvering and descending of the VTOL aircraft are generated also based on the wind information.

In some cases, the system further includes a wind sensor, and the wind information is obtained from the wind sensor.

In some cases, the wind information is obtained from an external wind sensor, external to the system.

In some cases, the wind information is obtained by analyzing information obtained from a fourth sensor.

In some cases, the at least part of the scene is identified by a user of the system, or by a machine learning algorithm.

In some cases, the potential landing areas are identified using information of characteristics of the VTOL aircraft.

In some cases, the characteristics include one or more of: a model and make, a size, a weight, a height, a center of gravity, payload size and geometry, payload weight, landing gear characteristics, or pre-defined allowed ground inclination.

In some cases, upon identifying that the selected landing area is no longer one of the potential landing areas, the processing resource is further configured to generate second maneuvering commands configured to cause maneuvering of the VTOL aircraft towards a new selected landing area of the potential landing areas, other than the selected landing area.

In some cases, upon identifying that there are no potential landing areas, the processing resource is further configured to generate an abort command for aborting the landing process.

In accordance with a second aspect of the presently disclosed subject matter, there is provided a method for autonomously landing a Vertical Take-Off and Landing (VTOL) aircraft, the method comprising: (a) obtaining, from a first sensor of a sensor payload, first readings enabling generating a Three-Dimensional (3D) model of at least part of a scene visible by the first sensor; (b) generating, at a first rate, based on at least part of the first readings, the 3D model of the at least part of the scene; (c) obtaining, from a second, sensor of the sensor payload, a plurality of second readings, enabling identifying changes within the at least part of the scene visible by the first sensor; (d) analyzing at least part of the second readings, at a second rate, different than the first rate, to obtain changes information indicative of the changes within the at least part of the scene; (e) identifying, using the 3D model and the changes information, potential landing areas for the VTOL aircraft, being landing areas on which the VTOL aircraft is capable of landing; (f) generating maneuvering commands configured to cause maneuvering and descending of the VTOL aircraft towards a selected landing area of the potential landing areas; and (g) repeating steps (a) to (f) until landing the VTOL aircraft.

In some cases, the scene is an unknown scene, and there is no prior 3D model of the scene.

In some cases, the second rate is higher than the first rate.

In some cases, the changes result from motion of one or more objects within the at least part of the scene.

In some cases, the changes information is obtained by analyzing groups of at least pairs of the second readings.

In some cases, the potential landing areas are not pre-marked.

In some cases, the potential landing areas are unattended.

In some cases, the aircraft is a drone.

In some cases, the second sensor is the first sensor, or a part thereof.

In some cases, at least one of the first sensor or the second sensor is one of the following: a Light Detection And Ranging (LIDAR), a radar, a structured light sensor, a Time Of Flight (TOF) sensor, a stereoscopic camera, a camera, a Doppler sensor, an ultrasonic sensor, or a video motion detection (VMD) sensor.

In some cases, the method further comprises: obtaining at least one reading from a third sensor of the sensor payload, wherein the third sensor is capable of acquiring information enabling identification of obstacles between the VTOL aircraft and the selected landing area, and wherein the maneuvering commands are generated so that the VTOL aircraft avoids existing obstacles, if any, on its path to the selected landing area.

In some cases, the third sensor is a Continuous Transmission Frequency Modulated (CTFM) ultrasonic sensor.

In some cases, the method further comprises: executing an optical flow algorithm, upon the VTOL aircraft reaching a pre-determined height with respect to the selected landing area, based on readings acquired by at least one of the first sensor or the second sensor to obtain optical flow information; and utilizing the optical flow information to maneuver the VTOL aircraft until the landing of the VTOL aircraft.

In some cases, the method further comprises: executing an optical flow algorithm, upon the VTOL aircraft reaching a pre-determined height with respect to the selected landing area, based on readings acquired by an optical flow sensor to obtain optical flow information; and utilizing the optical flow information to maneuver the VTOL aircraft until the landing of the VTOL aircraft.

In some cases, the generating of the 3D model is performed when the VTOL aircraft is below a first pre-determined height with respect to a reference point, the analyzing is performed when the VTOL aircraft is below a second pre-determined height with respect to the reference point, and the second pre-determined height is different than the first pre-determined height.

In some cases, the method further comprises: obtaining wind information, wherein the identifying is performed based also on the wind information.

In some cases, the method further comprises: obtaining wind information, wherein the maneuvering commands are generated also based on the wind information.

In some cases, the wind information is obtained from a wind sensor of the sensor payload.

In some cases, the wind information is obtained from an external wind sensor, external to the sensor payload.

In some cases, the wind information is obtained by analyzing information obtained from a fourth sensor.

In some cases, the at least part of the scene is identified by a user of the VTOL aircraft, or by a machine learning algorithm.

In some cases, the potential landing areas are identified using information of characteristics of the VTOL aircraft.

In some cases, the characteristics include one or more of: a model and make, a size, a weight, a height, a center of gravity, payload size and geometry, payload weight, landing gear characteristics, or pre-defined allowed ground inclination.

In some cases, upon identifying that the selected landing area is no longer one of the potential landing areas, the method further comprises: generating second maneuvering commands configured to cause maneuvering of the VTOL aircraft towards a new selected landing area of the potential landing areas, other than the selected landing area.

In some cases, upon identifying that there are no potential landing areas, the method further comprises: generating an abort command to abort the landing.

In accordance with a third aspect of the presently disclosed subject matter, there is provided a non-transitory computer readable storage medium having computer readable program code embodied therewith, the computer readable program code, executable by at least one processor of a computer to perform a method for autonomously landing a Vertical Take-Off and Landing (VTOL) aircraft comprising: (a) obtaining, from a first sensor of a sensor payload, first readings enabling generating a Three-Dimensional (3D) model of at least part of a scene visible by the first sensor; (b) generating, at a first rate, based on at least part of the first readings, the 3D model of the at least part of the scene; (c) obtaining, from a second sensor of the sensor payload, a plurality of second readings, enabling identifying changes within the at least part of the scene visible by the first sensor; (d) analyzing at least part of the second readings, at a second rate, different than the first rate, to obtain changes information indicative of the changes within the at least part of the scene; (e) identifying, using the 3D model and the changes information, potential landing areas for the VTOL aircraft, being landing areas on which the VTOL aircraft is capable of landing; (f) generating maneuvering commands configured to cause maneuvering and descending of the VTOL aircraft towards a selected landing area of the potential landing areas; and (g) repeating steps (a) to (f) until landing the VTOL aircraft.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "generating", "analyzing", "identifying", "repeating", "acquiring", "executing", "utilizing", "identifying" or the like, include actions and/or processes including, inter ilia, actions and/or processes of a computer, that manipulate and/or transform data into other data, said data represented as physical quantities, e.g. such as electronic quantities, and/or said data representing the physical objects. The terms "computer", "processor", "processing resource" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1:
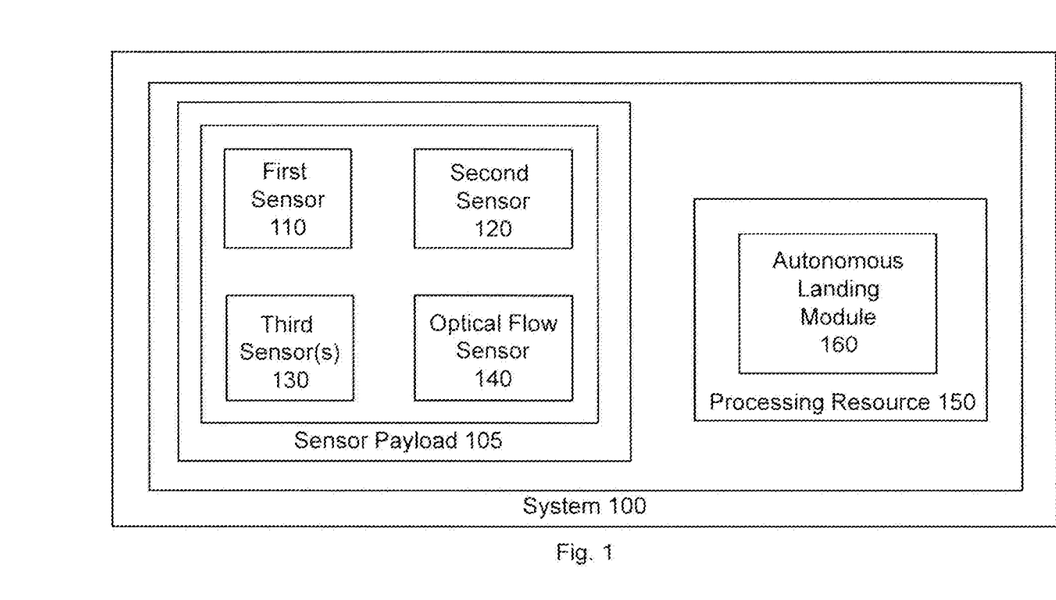
FIG. 1 is a block diagram schematically illustrating one example of a system for autonomously landing a Vertical Take-Off and Landing (VTOL) aircraft, in accordance with the presently disclosed subject matter.
Figure 2:
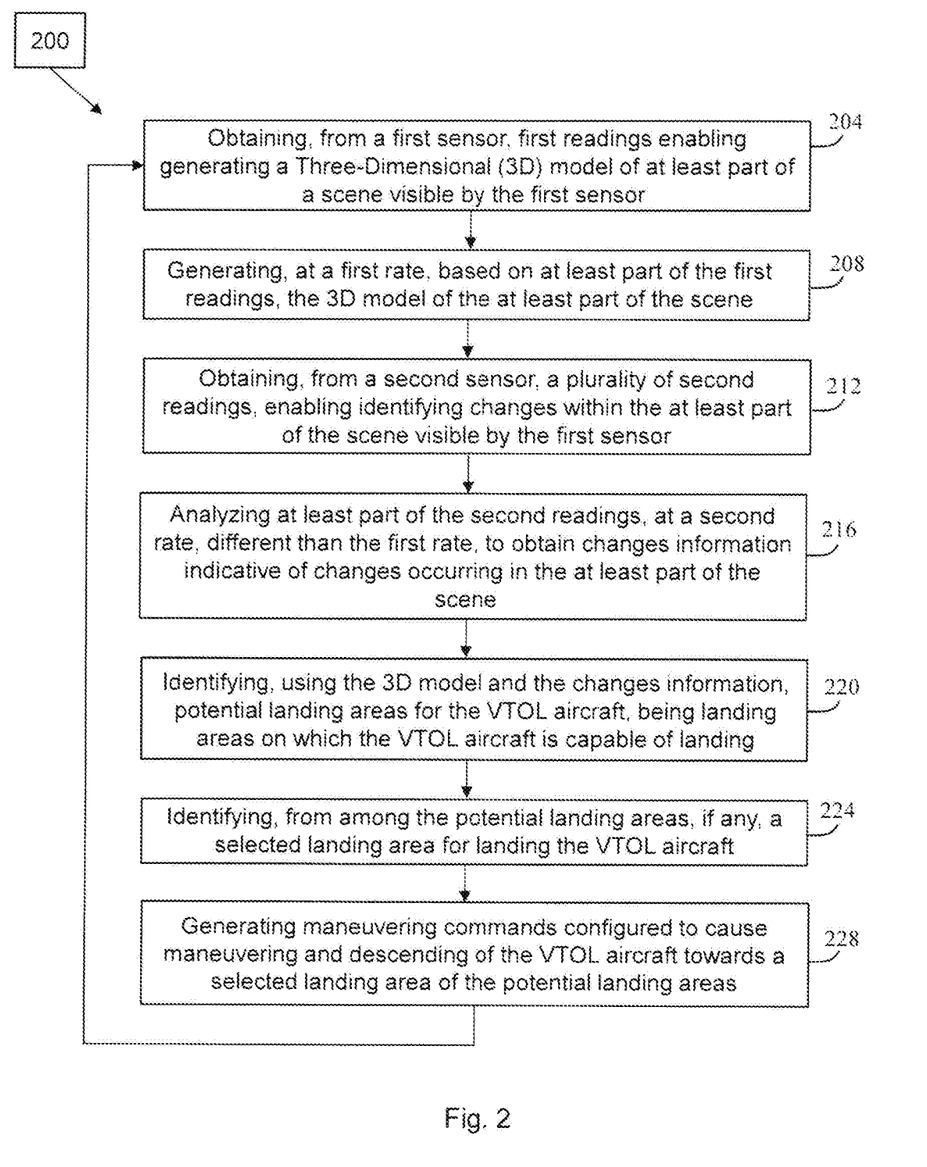
FIG. 2 is a flowchart illustrating one example of a sequence of operations for autonomously landing a VTOL aircraft, in accordance with the presently disclosed subject matter.

In embodiments of the presently disclosed subject matter, fewer, more and/or different stages than those shown in FIG. 2 may be executed. In embodiments of the presently disclosed subject matter, one or more stages illustrated in FIG. 2 may be executed in a different order and/or one or more groups of stages may be executed simultaneously. FIG. 1 illustrates a general schematic of the system architecture in accordance with embodiments of the presently disclosed subject matter. Each module in FIG. 1 can be made up of any combination of software, hardware and/or firmware that performs the functions as defined and explained herein. The modules in FIG. 1 may be centralized in one location or dispersed over more than one location. In other embodiments of the presently disclosed subject matter, the system may comprise fewer, more, and/or different modules than those shown in FIG. 1.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, a block diagram schematically illustrating one example of a system 100 for autonomously landing a Vertical Take-Off and Landing (VTOL) aircraft, in accordance with the presently disclosed subject matter.

In accordance with the presently disclosed subject matter, system 100 can be installed on the VTOL aircraft (e.g., on the bottom of the VTOL aircraft so that the sensors of system 100 have a clear line of sight for detecting obstacles, structures or human activity). In some cases, the VTOL aircraft can be manned (e.g. a manned helicopter). In some cases, the VTOL aircraft can be unmanned. In some cases, the unmanned VTOL aircraft can be a drone, which can optionally be autonomous.

System 100 can be configured to autonomously land the VTOL aircraft by detecting structures, low and high profile obstacles and even human activity below the VTOL aircraft. Accordingly, system 100 can be configured to autonomously land the VTOL aircraft in an area that can be unknown, unmarked, and unprepared, or in a known, prepared area that can optionally be unattended.

System 100 can be configured to include a sensor payload 105. Sensor payload 105 can be configured to include a first sensor 110. First sensor 110 can be one of the following: a 2D or 3D camera, a Light Detection and Ranging (LIDAR), a radar, a structured light sensor, a Time of Flight (TOF) sensor, a stereoscopic camera, a Doppler sensor, an ultrasonic sensor, or a video motion detection (VMD) sensor (e.g. a camera with processing capabilities that can execute VMD algorithms). First sensor 110 can be configured to generate first readings enabling generating a Three-Dimensional (3D) model of at least part of a scene visible by first sensor 110, as detailed further herein, inter alia with reference to FIGS. 2 and 3.

Sensor payload 105 can also be configured to include a second sensor 120. Second sensor 120 can be one of the following: a VMD sensor (e.g. a camera with processing capabilities that can execute VMD algorithms), a Light Detection and Ranging (LIDAR), a radar, a structured light sensor, a Time of Flight (TOF) sensor, a stereoscopic camera, a 2D or 3D camera, a Doppler sensor, or an ultrasonic sensor. Second sensor 120 can be configured to generate a plurality of second readings, enabling identifying changes within the at least part of a scene visible by the first sensor 110, as detailed further herein, inter alia with reference to FIGS. 2 and 3.

In some cases, the second sensor 120 can be the first sensor 110, or a part thereof (e.g. a single camera of a stereoscopic camera array).

In some cases, sensor payload 105 can be configured to include at least one third sensor 130. Third sensor 130 can be configured to acquire information enabling identification of obstacles that are hard to distinguish optically (e.g., electrical wires, etc.). In some cases, the third sensor 130 can be an ultrasonic sensor (e.g. a Continuous Transmission Frequency Modulated (CTFM) ultrasonic sensor). Additionally, or alternatively, in some cases, the third sensor 130 can be one or more of: first sensor 110 or a part thereof or second sensor 120 or a part thereof.

Additionally, or alternatively, in some cases, sensor payload 105 can be configured to include an optical flow sensor 140 (that is optionally the first, sensor 110 or a part thereof or the second sensor 120 or a part thereof). Optical flow sensor 140 can be configured to generate optical flow information, as detailed further herein, inter alia with reference to FIGS. 2 and 3.

Additionally, or as a further alternative, in some cases, sensor payload 105 can be configured to include a wind sensor (not shown) to provide wind information.

System 100 can be further configured to include a processing resource 150. Processing resource 150 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data, including data for autonomously landing the VTOL aircraft.

Processing resource 150 can be configured to include an autonomous landing module 160. Autonomous landing module 160 can be configured to autonomously land the VTOL aircraft, as detailed further herein, inter alfa with reference to FIGS. 2 and 3.

Figure 3:
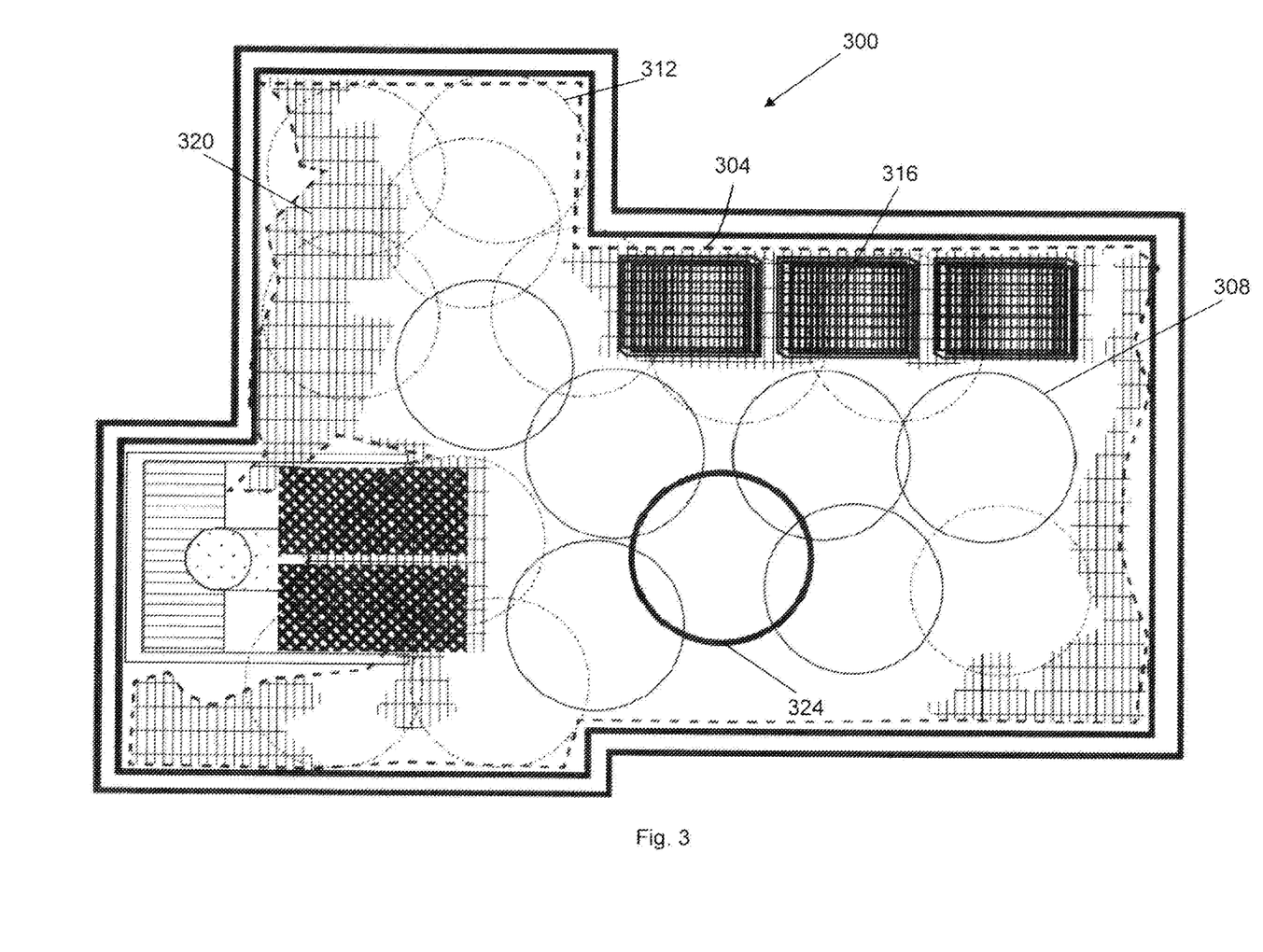
FIG. 3 is one example of a schematic diagram of a designated landing zone on which the VTOL aircraft can be landed, in accordance with the presently disclosed subject matter.

Attention is now drawn to FIGS. 2 and 3. FIG. 2 is a flowchart illustrating one example of a sequence of operations 200 for autonomously landing a VTOL aircraft, in accordance with the presently disclosed subject matter. FIG. 3 is one example of a schematic diagram 300 of a designated landing zone on which the VTOL aircraft can be landed.

In accordance with the presently disclosed subject matter, prior to autonomously landing the VTOL aircraft, the landing zone on which to land the VTOL aircraft can be identified. In some cases, the landing zone can be identified by a user of the system 100 (e.g., by providing coordinates of the landing zone, by selecting a polygon from a map Graphical User Interface (GUI) of the system 100, etc.). Alternatively, in some cases, processing resource 150 can be configured to automatically identify the landing zone. In some cases, processing resource 150 can be configured to identify the landing zone using image processing. Additionally, or alternatively, in some cases, processing resource 150 can be configured to identify the landing zone using a machine learning algorithm (e.g., by analyzing aerial images of the general area in which the VTOL aircraft is to be landed and identifying the landing zone autonomously based on a pre-given mission, flight safety requirements, etc.). In FIG. 3, the dashed line 304 indicates the outer boundary of the landing zone.

After the VTOL aircraft drops below a first pre-determined height (e.g., approximately 30 meters above the landing zone), autonomous landing module 160 can be configured to perform a landing process for landing the VTOL aircraft. Autonomous landing module 160 can be configured to obtain, from first sensor 110, first readings enabling generating a Three-Dimensional (3D) model of at least part of a scene visible by first sensor 110 (block 204), the at least part of the scene including at least a part of the landing zone. In some cases, the scene can be a previously unknown scene, such that the autonomous landing module 160 does not have a prior 3D model of the scene.

Autonomous landing module 160 can be configured to generate, at a first rate, based on at least part of the first readings, the 3D model of the at least part of the scene (block 208).

In some cases, autonomous landing module 160 can be configured, based on the 3D model, to identify potential landing areas 308 (illustrated in FIG. 3) for the VTOL aircraft, being landing areas on which the VTOL aircraft is capable of landing. The potential landing areas 308 can be identified by performing a 3D surface analysis of the at least part of the scene based on the 3D model, the 3D surface analysis being indicative, inter alia, of distances between objects in the at least part of the scene and slopes in the at least part of the scene. The 3D surface analysis can be based, for example, on the random sample consensus (RANSAC) algorithm.

Autonomous landing module 160 can be further configured to obtain, from second sensor 120, a plurality of second readings, enabling identifying changes within the at least part of the scene visible by the first sensor 110 (block 212). Autonomous landing module 160 can be further configured to analyze at least part of the second readings, at a second rate, different than the first rate, to obtain changes information indicative of changes occurring in the at least part of the scene (block 216). In some cases, the second rate can be higher than the first rate.

As an illustrative, non-limiting example, autonomous landing module 160 can be configured to generate 3D models at each fifth time frame, and to obtain changes information at intervening time frames between the time frames at which the 3D models are generated (i.e., a 3D model can be generated, for example, at time frames 1, 6, 11, . . . , etc. and changes information can be obtained at time frames 2-5, 7-10, 12-15, . . . , etc.).

In some cases, the changes occurring in the at least part of the scene can be the motion of one or more objects within the at least part of the scene, including, inter alia, the motion of objects on the landing zone and/or in a landing path of the VTOL aircraft. Additionally, or alternatively, in some cases, the changes information can be obtained by analyzing groups of at least pairs of the second readings.

By obtaining changes information between the generation of successive 3D models, autonomous landing module 160 can be configured to reliably land the VTOL aircraft while increasing a time interval between successive generations of the 3D models. This enables reducing processing overhead relative to the processing overhead required to perform the landing process only based on the 3D models, since the processing overhead required for obtaining changes information is less than the processing overhead required for generating a 3D model. In this manner, the battery power of the system 100 can be better conserved, and the size and weight of the system 100 can be reduced.

Autonomous landing module 160 can be configured to identify, using the 3D model and the changes information, potential landing areas 308 for the VTOL aircraft (block 220).

In some cases, the potential landing areas 308 are not pre-marked. Additionally, or alternatively, in some cases, the potential landing areas 308 are unattended.

In FIG. 3, the areas that are non-suitable for landing, e.g. due to interfering objects in the landing path or the landing zone, including, inter alia, obstacles, structures or human activity, are illustrated in FIG. 3 by dotted circles 312. As illustrated in FIG. 3, in some cases, the areas that are non-suitable for landing can include areas having fixed interfering objects in the landing zone (e.g., air conditioner units 316). Additionally, or alternatively, in some cases, the areas that are not suitable for landing can include areas in the landing zone having movable interfering objects, including, inter alia, structures, obstacles or human activity, or areas in the landing path of the VTOL aircraft that include overhead interfering objects (e.g., electrical wires). Areas in the landing path or the landing zone that include such fixed/movable/overhead interfering objects are identified in FIG. 3 by checkerboard patterns 320.

The potential landing areas 308 can be identified using information of characteristics of the VTOL aircraft. In some cases, in which the potential landing areas 308 are circular, the potential landing areas 308 can have a pre-defined radius based on this information. However, the potential landing areas 308 can be of any desired shape (square, rectangle, polygon, etc.) The characteristics of the VTOL aircraft, based on which the potential landing areas 308 can be identified, can include one or more of: a model and make, a size, a weight, a height, a center of gravity, payload size and geometry, payload weight, landing gear characteristics, or pre-defined allowed ground inclination. The landing gear characteristics can be one or more of size of the landing gear or height of the landing gear.

Autonomous landing module 160 can be configured to identify, from among the potential landing areas 308, if any, a selected landing area 324 for landing the VTOL aircraft (block 224). It is to be noted that at any time at which autonomous landing module 160 identifies potential landing areas 308, autonomous landing module 160 can be configured to identify a selected landing, area 324 for landing the VTOL aircraft. In some cases, the selected landing area 324 can be the most suitable potential landing area 308 for landing the VTOL aircraft. In some cases, as illustrated in FIG. 3, the selected landing area 324 is preferably spaced from interfering objects on the landing zone and from edges of the landing zone unless pre-defined mission related issues require otherwise (e.g. if the mission requires landing near the edges of the landing zone).

Autonomous landing module 160 can be further configured, in response to identifying the selected landing area 324, to generate maneuvering commands configured to maneuver the VTOL aircraft to descend towards the selected landing area 324 (block 228).

Autonomous landing module 160 can be configured to repeat blocks 204 to 228 until landing the VTOL aircraft. As the VTOL aircraft descends towards the landing zone, more accurate information is obtained;regarding interfering objects in the landing zone and in the landing path, and movement of interfering objects within the landing zone and along the landing path is identified. By repeating blocks 204 to 228, autonomous landing module 160 can be configured to re-identify potential landing areas 308 for the VTOL aircraft as the VTOL aircraft descends. In this manner, autonomous landing module 160 can be configured to change the selected landing area 324, if necessary, as the VTOL aircraft descends.

In some cases, if the selected landing area 324 prior to a given repetition of blocks 204 to 220 remains one of the potential landing areas 308 after the given repetition of blocks 204 to 220, autonomous landing module 160 can be configured to continue generating maneuvering commands configured to maneuver the VTOL aircraft to descend towards the selected landing area 324.

If the selected landing area 324 prior to a given repetition of blocks 204 to 220 does not remain one of the potential landing areas 308 after the given repetition of blocks 204 to 220, e.g. due to new data from at least one of the 3D model or changes information (or any other data such as readings from third sensor 130 or wind information, as detailed further herein), autonomous landing module 160 can be configured to identify a new selected landing area 324, and to generate maneuvering commands configured to maneuver the VTOL aircraft to descend towards the new selected landing area 324.

If, after a given repetition of blocks 204 to 220, no potential landing areas 308 are identified, autonomous landing module 160 can be configured to abort the landing process (e.g. by ascending).

In some cases, autonomous landing module 160 can be configured to initially generate the 3D model when the VTOL aircraft is below a first pre-determined height of the VTOL aircraft with respect to a reference point, including, inter alia, at least part of a scene visible by first sensor 110, a landing zone, or the ground. Autonomous landing module 160 can be further configured to initially analyze the at least part of the second readings to obtain changes information when the VTOL aircraft is below a second pre-determined height of the VTOL aircraft with respect to the reference point, wherein the second pre-determined height is different than the first pre-determined height. In some cases, the first pre-determined height is greater than the second pre-determined height.

In some cases, autonomous landing module 160 can be configured to obtain at least one reading from third sensor 130 during the landing process, the third sensor 130 being capable of acquiring information enabling identification of obstacles between the VTOL aircraft and a selected landing path/area. Such obstacles can be obstacles that are hard to distinguish optically (e.g., electrical wires, etc.). In some cases, autonomous landing module 160 can be configured, in response to obtaining the at least one reading from third sensor 130, to generate maneuvering commands so that the VTOL aircraft avoids the identified obstacles, if any, on its path to the selected landing area 324.

Additionally, in some cases, autonomous landing module 160 can be configured, in response to obtaining the at least one reading from third sensor 130, to identify a new selected landing area 324 from among the potential landing areas 308, if any, to avoid the identified obstacles (if any).

In some cases, upon the VTOL aircraft dropping below a second pre-determined height (e.g., a few meters) with respect to the landing zone (e.g., the selected landing area 324), autonomous landing module 160 can be configured to execute an optical flow algorithm based on optical flow readings to obtain optical flow information, and to use the optical flow information to maneuver the VTOL aircraft until landing, in combination with other sensors in sensor payload 105, including first sensor 110 and second sensor 120, and optionally also in combination with additional sensors (that can optionally be external to the sensor payload 105) such as third sensor 130 and/or fourth sensor. By using the optical flow information to maneuver the VTOL aircraft until landing, autonomous landing module 160 can be configured to land the VTOL aircraft with greater accuracy for a safe landing. In some cases, the optical flow readings can be acquired by at least one of first sensor 110 or second sensor 120. Alternatively, in some cases, the optical flow readings can be acquired by a dedicated optical flow sensor 140.

In some cases, autonomous landing module 160 can be further configured to obtain wind information (wind speed, wind direction, etc.). In some cases, the wind information can be obtained by a wind sensor (not shown) of sensor payload 105. In some cases, the wind sensor can be one or more of: first sensor 110 or a part thereof or second sensor 120 or a part thereof. Additionally, or alternatively, in some cases, the wind information can be obtained by an external wind sensor, external to the system 100, or even external to the VTOL aircraft. Additionally, or as a further alternative, the wind information can be obtained by analyzing information obtained by a fourth sensor, which can, optionally, be part of sensor payload 105. For example, the wind information can be obtained by an analysis of images obtained by a fourth sensor (e.g., a camera) or an analysis of global positioning system (GPS) signals obtained by a fourth sensor (e.g., a GPS).

In some cases, the wind information can be wind information (wind speed, wind direction, etc.) obtained at one or more points at a distance from the VTOL aircraft. In some cases, such wind information can be obtained by range-gated laser imaging. Specifically, a pulsed laser can fire one or more laser pulses towards a given point at a given distance from the VTOL aircraft at one or more first instances of time. One or more time-gated imaging sensors (e.g., a camera) can be synchronized to obtain a plurality of readings that are indicative of scattered light reflected at the given point based on the fired laser pulses. The wind information at the given point can be obtained by analyzing the correlation between the readings.

In some cases, the wind information can represent an effect of the wind (wind speed, wind direction, etc.) on the position of the VTOL aircraft. For example, by using image analysis or GPS signals, a difference between an expected position of the VTOL aircraft and an actual position of the VTOL aircraft can be determined, the difference being an effect of the wind (wind speed, wind direction, etc.) on the position of the VTOL aircraft.

In some cases, autonomous landing module 160 can be configured to consider the wind information when identifying a selected landing area 324 (e.g., by identifying a selected landing area 324 that is at a greater distance from interfering objects on the landing zone and edges of the landing zone as the wind speed increases). In some cases, when using GPS, the GPS readings based on which the wind information is determined can be obtained from a GPS sensor external to the system 100 (e.g. it can be a GPS sensor of a platform on which system 100 is installed).

In some cases, autonomous landing module 160 can be configured to identify potential landing areas 308 based also on the wind information. For example, at least some of the potential landing areas 308 can be closer to obstacles in, its surroundings when the wind speed is lower and farther from obstacles in its surroundings when the wind speed is high.

Additionally, or alternatively, in some cases, autonomous landing module 160 can be configured to generate the maneuvering commands to maneuver the VTOL aircraft to descend towards a selected landing area 324 also based on the wind information.

It is to be noted that, with reference to FIG. 2, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system for autonomously landing a Vertical Take-Off and Landing (VTOL) aircraft, the system comprising:
   a sensor payload, the sensor payload including a first sensor and a second sensor that are located on the bottom of the VTOL aircraft, wherein the first sensor and the second sensor have a clear line-of-sight to objects below the VTOL aircraft;
   a processing resource configured to perform the following during a landing process for landing the VTOL aircraft:
      when the VTOL aircraft is below a first pre-determined height with respect to a reference point, repeatedly:
         (a) obtain; from the first sensor, first readings enabling generating a Three-Dimensional (3D) model of at least part of a scene visible by the first sensor; and
         (b) generate, based on at least part of the first readings; the 3D model of the at least part of the scene; and
      upon, and only upon, the VTOL aircraft descending below a second pre-determined height with respect to the reference point, the second pre-determined height being lower than the first pre-determined height with respect to the reference point, performing all of the following steps:
         (c) identify, using the 3D model, first potential landing areas for the VIOL aircraft, the first potential landing areas being landing areas within a landing zone on which the VTOL aircraft is capable of landing;
         (d) generate maneuvering commands configured to cause maneuvering and descending of the VTOL aircraft towards a first selected landing area of the first potential landing areas;
         (e) obtain, from the second sensor, a plurality of second readings, enabling identifying changes within the at least part of the scene visible by the first sensor;
         (f) analyze at least part of the second readings, at a second rate, different than a first rate at which the 3D model is generated, to obtain changes information indicative of the changes within the at least part of the scene, the analyze not including an updating of the 3D model, and the changes being a motion of one or more of the objects within at least one of: (1) the landing zone or (2) a landing path of the VTOL aircraft;
         (g) identify, using the 3D model and the changes information, second potential landing areas for the VIOL aircraft, the second potential landing areas being the landing areas within the landing zone on which the VIOL aircraft is capable of landing;
         (h) generate second maneuvering commands configured to cause maneuvering and descending of the VIOL aircraft towards a second selected landing area of the second potential landing areas; and
         (i) repeat steps (a) to (h) until landing the VIOL aircraft;
      wherein, upon the second potential landing areas not including the first selected landing area, due to the changes information, the second selected landing area is distinct from the first selected landing area.

2. The system of claim 1, wherein the first potential landing areas are unattended and not pre-marked, the scene is an unknown scene, and the processing resource does not have a prior 3D model of the scene.

3. The system of claim 1, wherein the aircraft is a drone.

4. The system of claim 1, wherein the second sensor is the first sensor, or a part thereof.

5. The system of claim 1, wherein at least one of the first sensor or the second sensor is one of the following: a Light Detection And Ranging (LIDAR), a radar, a structured light sensor, a Time Of Flight (TOF) sensor, a stereoscopic camera, a camera, a Doppler sensor, an ultrasonic sensor, or a video motion detection (VMD) sensor.

6. The system of claim 1, further comprising a third sensor capable of acquiring information enabling identification of obstacles between the VTOL aircraft and a respective landing area, the respective landing area being the first selected landing area or the second selected landing area, wherein the processing resource is further configured to obtain at least one reading from the third sensor during the landing process, and wherein the maneuvering commands are generated so that the VIOL aircraft avoids existing obstacles, if any, on its path to the respective landing area.

7. The system of claim 6, wherein the third sensor is a Continuous Transmission Frequency Modulated (CTFM) ultrasonic sensor.

8. The system of claim 1, wherein upon the VIOL aircraft reaching a pre-determined height with respect to a respective landing area, the respective landing area being the first selected landing area or the second selected landing area, the processing resource is configured to execute an optical flow algorithm based on readings acquired by at least one of the first sensor or the second sensor or by an optical flow sensor to obtain optical flow information and utilize the optical flow information to maneuver the VTOL aircraft until the landing of the VTOL aircraft.

9. The system of claim 1, wherein the first potential landing areas are identified using information of characteristics of the VTOL aircraft.

10. The system of claim 1, wherein the second rate is higher than the first rate.

11. A method for autonomously landing a Vertical Take-Off and Landing (VTOL) aircraft, the method comprising:
when the VTOL aircraft is below a first pre-determined height with respect to a reference point, repeatedly:
(a) obtaining, from a first sensor of a sensor payload, first readings enabling generating a Three-Dimensional (3D) model of at least part of a scene visible by the first sensor; and
(b) generating, based on at least part of the first readings, the 3D model of the at least part of the scene; and
upon, and only upon, the VTOL aircraft descending below a second pre-determined height with respect to the reference point, the second pre-determined height being lower than the first pre-determined height with respect to the reference point, performing all of the followiniI steps:
(c) identifying, using the 3D model, first potential landing areas for the VTOL aircraft, the first potential landing areas being landing areas within a landing zone on which the VTOL aircraft is capable of landing;
(d) generating maneuvering commands configured to cause maneuvering and descending of the VTOL aircraft towards a first selected landing area of the first potential landing areas;
(e) obtaining, from a second sensor of the sensor payload, a plurality of second readings, enabling identifying changes within the at least part of the scene visible by the first sensor, wherein the first sensor and the second sensor are located on the bottom of the VTOL aircraft, and have a clear line-of-sight to objects below the VTOL aircraft,
(f) analyzing at least part of the second readings, at a second rate, different than a first rate at which the 3D model is generated, to obtain changes information indicative of the changes within the at least part of the scene, the analyzing not including an updating of the 3D model, and the changes being a motion of one or more of the objects within at least one of: (1) the landing zone or (2) a landing path of the VTOL aircraft:
(g) identifying, using the 3D model and the changes information, second potential landing areas for the VTOL aircraft, the second potential landing areas being the landing areas within the landing zone on which the VTOL aircraft is capable of landing;
(h) generating second maneuvering commands configured to cause maneuvering and descending of the VTOL aircraft towards a second selected landing area of the second potential landing areas; and
(i) repeating steps (a) to (h) until landing the VIOL aircraft;
wherein, upon the second potential landing areas not including the first selected landing area, due to the changes information, the second selected landing area is distinct from the first selected landing area.

12. The method of claim 11, wherein the first potential landing areas are unattended and not pre-marked, the scene is an unknown scene, and wherein there is no prior 3D model of the scene.

13. The method of claim 11, further comprising:
obtaining at least one reading from a third sensor of the sensor payload, wherein the third sensor is capable of acquiring information enabling identification of Obstacles between the VTOL aircraft and a respective landing area, the respective landing area being the first selected landing area or the second selected landing area, and wherein the maneuvering commands are generated so that the VIOL aircraft avoids existing obstacles, if any, on its path to the respective landing area.

14. The method of claim 11, further comprising:
executing an optical flow algorithm, upon the VTOL aircraft reaching a pre-determined height with respect to a respective landing area, the respective landing area being the first selected landing area or the second selected landing area, based on readings acquired by at least one of the first sensor or the second sensor, or by an optical flow sensor, to obtain optical flow information; and
utilizing the optical flow information to maneuver the VTOL aircraft until the landing of the VIOL aircraft.

15. The method of claim 11, wherein the first potential landing areas are identified using information of characteristics of the VTOL aircraft.

16. A non-transitory computer readable storage medium having computer readable program code embodied therewith, the computer readable program code, executable by at least one processor of a computer to perform a method for autonomously landing a Vertical Take-Off and Landing (VTOL) aircraft comprising:
when the VTOL aircraft is below a first pre-determined height with respect to a reference, point, repeatedly:
(a) obtaining, from a first sensor of a sensor payload, first readings enabling generating a Three-Dimensional (3D) model of at least part of a scene visible by the first sensor;
(b) generating, based on at east part of the first readings, the 3D model of the at least part of the scene;
upon, and only upon, the VTOL aircraft descending below the second pre-determined height with respect to the reference point, the second pre-determined height being lower than the first pre-determined height with respect to the reference point, performing all of the following steps:
(c) identifying, using the 3D model, first potential landing areas for the VTOL aircraft, the first potential landing areas being landing areas within a landing zone on which the VTOL aircraft is capable of landing;
(d) generating maneuvering commands configured to cause maneuvering and descending of the VTOL aircraft towards a first selected landing area of the first potential landing areas;

(e) obtaining, from a second sensor of the sensor payload, a plurality of second readings, enabling identifying changes within the at least part of the scene visible by the first sensor, wherein the first sensor and the second sensor are located on the bottom of the VTOL aircraft, and have a clear line-of-sight to objects below the VIOL aircraft;

(f) analyzing at least part of the second readings, at a second rate, different than a first rate at which the 3D model is generated, to obtain changes information indicative of the changes within the at least part of the scene, the analyzing not including an updating of the 3D model, and the changes being a motion of one or more of the objects within at least one of: (1) the landing zone or (2) a landing path of the VIOL aircraft;

(g) identifying, using the 3D model and the changes information, second potential landing areas for the VTOL aircraft, the second potential landing areas being the landing areas within the landing zone on which the VTOL aircraft is capable of landing;

(h) generating second maneuvering commands configured to cause maneuvering and descending of the VTOL aircraft towards a second selected landing area of the second potential landing areas; and (i) repeating steps (a) to (h) until landing the VIOL aircraft;

wherein, upon the second potential landing areas not including the first selected landing area, due to the changes information, the second selected landing area is distinct from the first selected landing area.

* * * * *